(12) United States Patent
Tan

(10) Patent No.: US 11,960,806 B2
(45) Date of Patent: Apr. 16, 2024

(54) METHOD AND APPARATUS FOR CHECKING SCHEMATIC CIRCUIT DIAGRAM AND NON-TRANSITORY COMPUTER-READABLE STORAGE MEDIUM

(71) Applicant: UNIGROUP SPREADTRUM COMMUNICATIONS (HUIZHOU) CO., LTD., Guangdong (CN)

(72) Inventor: Qi Tan, Guangdong (CN)

(73) Assignee: UNIGROUP SPREADTRUM COMMUNICATIONS (HUIZHOU) CO., LTD., Huizhou (CN)

( * ) Notice: Subject to any disclaimer, the term of this patent is extended or adjusted under 35 U.S.C. 154(b) by 0 days.

(21) Appl. No.: 17/827,670

(22) Filed: May 28, 2022

(65) Prior Publication Data
US 2022/0284159 A1 Sep. 8, 2022

Related U.S. Application Data

(63) Continuation of application No. PCT/CN2020/127803, filed on Nov. 10, 2020.

(30) Foreign Application Priority Data

Nov. 29, 2019 (CN) .......................... 201911206334.3

(51) Int. Cl.
*G06F 30/31* (2020.01)
*G06F 30/323* (2020.01)

(52) U.S. Cl.
CPC ............ *G06F 30/31* (2020.01); *G06F 30/323* (2020.01)

(58) Field of Classification Search
CPC .... G06F 30/31; G06F 30/323; G06F 2115/12; G06F 30/33; G06F 30/398
See application file for complete search history.

(56) References Cited

U.S. PATENT DOCUMENTS

| 6,851,094 B1 * | 2/2005 | Robertson | G06F 30/30 709/217 |
| 8,650,515 B2 * | 2/2014 | Alam | G06F 30/33 716/136 |

(Continued)

FOREIGN PATENT DOCUMENTS

| CN | 1549670 A | 11/2004 |
| CN | 101394732 A | 3/2009 |

(Continued)

OTHER PUBLICATIONS

The extended European search report issued in corresponding EP application No. 20894499.1 dated May 4, 2023, 11 pages.

(Continued)

*Primary Examiner* — Nha T Nguyen
(74) *Attorney, Agent, or Firm* — Raj S. Dave; Dave Law Group LLC

(57) ABSTRACT

A method, an apparatus, and a system for checking a schematic circuit diagram are provided. The method includes: determining a netlist file and a bill of material (BOM) list of the schematic circuit diagram, where the schematic circuit diagram is drawn by an electronic design automation (EDA) tool; and determining whether parts in the schematic circuit diagram are in a preset part list and determining whether connection relationships among the parts meet preset connection relationships, according to the netlist file and the BOM list, to obtain a check result, where the preset part list includes standard part information of multiple parts.

20 Claims, 6 Drawing Sheets

(56) References Cited

U.S. PATENT DOCUMENTS

| | | | | |
|---|---|---|---|---|
| 9,830,414 | B2* | 11/2017 | Saghizadeh | G06F 30/36 |
| 10,592,704 | B2* | 3/2020 | Brookshire | G06F 30/398 |
| 10,664,644 | B1* | 5/2020 | Bot | G01R 31/31917 |
| 11,270,056 | B2* | 3/2022 | Bot | G06F 30/3308 |
| 2013/0047133 | A1* | 2/2013 | Alam | G06F 30/30 |
| | | | | 716/136 |
| 2020/0104435 | A1* | 4/2020 | Paszek | G06F 30/392 |

FOREIGN PATENT DOCUMENTS

| | | |
|---|---|---|
| CN | 101571569 A | 11/2009 |
| CN | 102402632 A | 4/2012 |
| CN | 103728552 A | 4/2014 |
| CN | 105740561 A | 7/2016 |
| CN | 107025362 A | 8/2017 |
| CN | 108228917 A | 6/2018 |
| JP | 2011003080 A | 1/2011 |
| TW | 201625958 A | 7/2016 |

OTHER PUBLICATIONS

The first office action issued in corresponding CN application No. 201911206334.3 dated Jun. 29, 2022, 13 pages.

* cited by examiner

METHOD AND APPARATUS FOR CHECKING SCHEMATIC CIRCUIT DIAGRAM AND NON-TRANSITORY COMPUTER-READABLE STORAGE MEDIUM

CROSS-REFERENCE TO RELATED APPLICATIONS

This application is a continuation application of International Application No. PCT/CN2020/127803, filed on Nov. 10, 2020, which claims priority to Chinese Patent Application No. 201911206334.3 filed on Nov. 29, 2019, the entire disclosure of which are incorporated herein by reference.

TECHNICAL FIELD

This disclosure relates to the field of testing technology, and in particular to a method, and an apparatus for checking a schematic circuit diagram and a non-transitory computer-readable storage medium.

BACKGROUND

In an actual production process, correctness of a schematic circuit diagram needs to be determined to realize rapid mass production. Therefore, the schematic circuit diagram needs to be checked to determine whether the schematic circuit diagram has problems. However, in related art, accuracy is low and costs are high for checking the schematic circuit diagram. Especially, a schematic circuit diagram of a complex system is unable to be dealt with calmly in the related art, often with problems such as missing hidden errors, long check time, and high check costs.

SUMMARY

A method for checking a schematic circuit diagram is provided in the present disclosure, and the method includes: determining a netlist file and a bill of material (BOM) list of the schematic circuit diagram, where the schematic circuit diagram is drawn by an electronic design automation (EDA) tool; and determining whether parts in the schematic circuit diagram are in a preset part list and determining whether connection relationships among the parts meet preset connection relationships, according to the netlist file and the BOM list, to obtain a check result, where the preset part list includes standard part information of multiple parts.

According to an aspect of the present disclosure, an apparatus for checking a schematic circuit diagram is provided. The apparatus includes a processor and a memory. The memory is configured to store processor-executable instructions, where the processor is configured to implement a method for checking a schematic circuit diagram.

According to an aspect of the present disclosure, a non-transitory computer-readable storage medium is provided and configured to store computer program instructions which, when executed by a processor, are operable with the processor to implement a method for checking a schematic circuit diagram.

Other features and aspects of the present disclosure will become apparent from the following elaboration of exemplary implementations with reference to the accompanying drawings.

BRIEF DESCRIPTION OF THE DRAWINGS

The accompanying drawings that are included in and constitute a part of the description, together with the description, illustrate exemplary implementations, features, and aspects of the present disclosure, and are intended for explaining the principles of the present disclosure.

DETAILED DESCRIPTION

Figure 1:
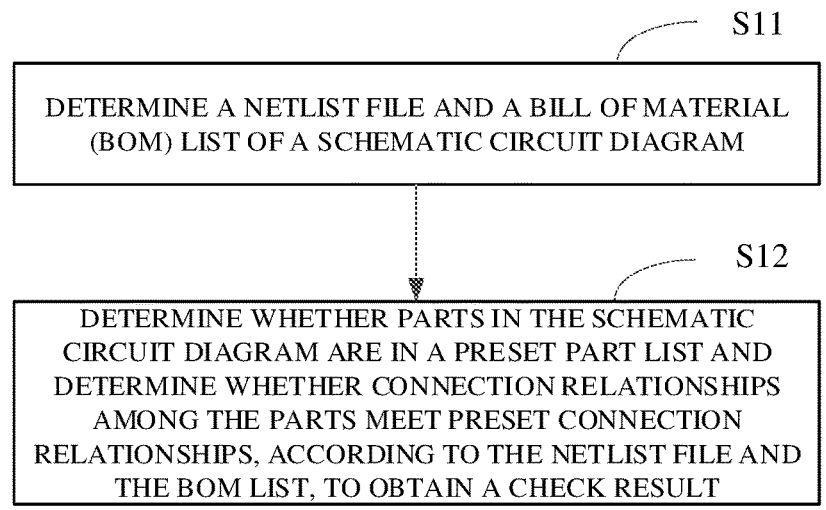
FIG. 1 is a flowchart of a method for checking a schematic circuit diagram according to an implementation of the present disclosure.

Various exemplary implementations, features, and aspects of the present disclosure will be described in detail below with reference to the accompanying drawings. The same reference numerals in the drawings represent elements with the same or similar functions. Although various aspects of the implementations are illustrated in the drawings, it is not necessary to draw the drawings to scale unless specifically noted.

The term "exemplary" herein means "as an example, implementation, or illustrative". Any implementation described herein as "exemplary" need not be interpreted as superior to or better than other implementations.

In addition, in order to better illustrate the disclosure, many specific details are given in the following specific implementations. Those skilled in the art should understand that the disclosure can still be implemented without some specific details. In some examples, methods, means, elements, and circuits well-known to those skilled in the art are not described in detail in order to highlight the subject matter of the disclosure.

Reference can be made to FIG. 1, which is a flowchart of a method for checking a schematic circuit diagram according to an implementation of the present disclosure.

The method can be applicable to at least one of an electronic device or a server.

As illustrated in FIG. 1, the method includes the following.

At step S11, determine a netlist file and a bill of material (BOM) list of a schematic circuit diagram, where the schematic circuit diagram is drawn by an electronic design automation (EDA) tool.

At step S12, determine whether parts in the schematic circuit diagram are in a preset part list and determine whether connection relationships among the parts meet preset connection relationships, according to the netlist file and the BOM list, to obtain a check result, where the preset part list includes standard part information of multiple parts.

According to the above method, in implementations of the present disclosure, a corresponding netlist file and a corresponding BOM list are determined according to the schematic circuit diagram, whether the parts in the schematic circuit diagram are in the preset part list is determined and whether connection relationships among the parts meet the preset connection relationships is determined, according to the netlist file and the BOM list, to check the schematic circuit diagram and obtain the check result. The method for checking the schematic circuit diagram proposed in the implementations of the present disclosure has characteristics of simplicity and accuracy, which can check the schematic circuit diagram quickly and accurately, so as to avoid missing hidden errors and reduce costs in checking, thereby improving check efficiency of the schematic circuit diagram.

It should be noted that in the present disclosure, implementations of determining the netlist file and the BOM list of the schematic circuit diagram at step S11 are not limited. Those skilled in the art can determine the netlist file and the BOM list of the schematic circuit diagram in a variety of manners, such as importing the schematic circuit diagram into an EDA software and exporting the netlist file and the BOM list of the schematic circuit diagram by the EDA software.

In the implementations of the present disclosure, part information of the circuit diagram is determined according to the netlist file and the BOM list exported from the schematic circuit diagram, which is more accurate than part information directly obtained from the schematic circuit diagram in related art. In addition, determining the part information according to the netlist file and the BOM list is universal and has low requirements for sources of the schematic circuit diagram, as long as the schematic circuit diagram is drawn by the EDA software.

In a possible implementation, the preset part list and the preset connection relationships can be configured as a standard file in advance. In an example, they can be stored in a database. When the netlist file and the BOM list of the schematic circuit diagram are determined at step S11, the preset part list and the preset connection relationships can be obtained from the database to check the parts of the schematic circuit diagram and the connection relationships among the parts. The preset part list can include standard part information of all or part of parts in a part library on which a circuit design is based, such as standard part information of parts commonly used by circuit design manufacturers. The preset connection relationships can include standard connection relationships of some common parts, all or part of specific connection relationships in a checked schematic circuit diagram, etc.

Figure 2:
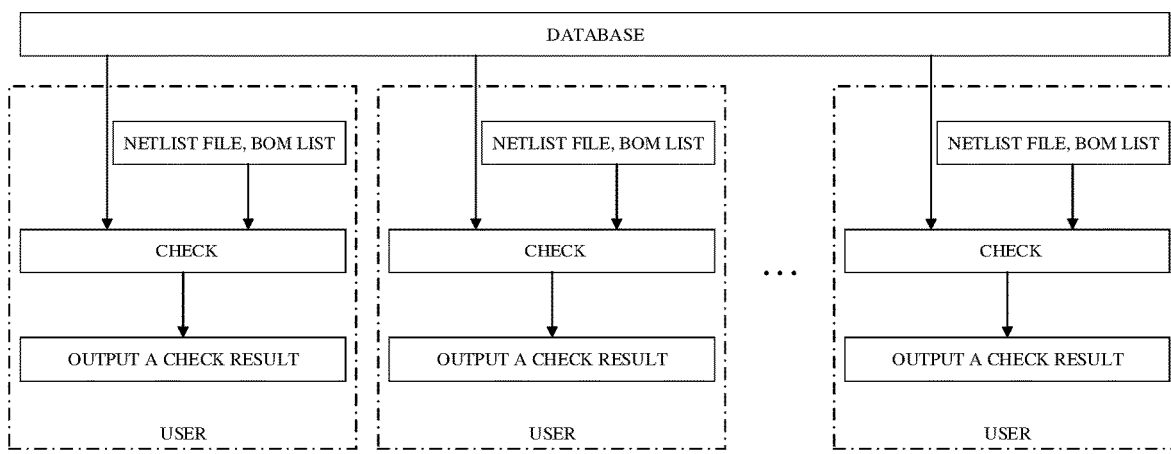
FIG. 2 is a schematic diagram of a method for checking a schematic circuit diagram according to an implementation of the present disclosure.

Reference can be made to FIG. 2, which is a schematic diagram of a method for checking a schematic circuit diagram according to an implementation of the present disclosure.

As illustrated in FIG. 2, the preset part list and the preset connection relationships are stored in the database, therefore, multiple tasks can be established to check schematic circuit diagrams of different users at the same time, and a check result of a schematic diagram of each user can be obtained respectively.

In the implementations of the present disclosure, the preset part list and the preset connection relationships are stored in the database to be invoked when the schematic circuit diagram is needed to be checked, such that multiple schematic circuit diagrams can be checked in parallel. When the multiple schematic circuit diagrams need to be checked in parallel, parallel tasks can be established. For each task, a preset part list and preset connection relationships can be obtained independently from the database and a schematic circuit diagram can be checked independently, which can improve efficiency and speed of checking circuits.

In the implementations of the present disclosure, whether the parts in the schematic circuit diagram are in the preset part list can be determined in multiple manners, and the following will give an exemplary introduction.

In a possible implementation, the standard part information can include standard part types of parts, and determining whether the parts in the schematic circuit diagram are in the preset part list according to the netlist file and the BOM list at step S12 includes: determining a part type of each part in the schematic circuit diagram according to the BOM list; and determining that a part exists in the preset part list, in a case that a standard part type identical with a part type of the part exists in the preset part list.

According to the above method, in the implementations of the present disclosure, the part type of each part in the schematic circuit diagram can be determined according to the BOM list, and whether the part exists in the preset part list can be simply and quickly determined by matching the part type of the part with the standard part type.

In an example, the netlist file of the schematic circuit diagram can include a part number, a pin number (PinNO), a pin name (PinName), a pin count (PinCount), a network name (NetName), etc., of each part. The BOM list can include a part number and a part type (PartType) of each part. Part numbers of identical parts are identical in the netlist file and the BOM list.

In an example, a network name can be used to indicate connection relationships among a pin of the part and pins of other parts. In general, keywords in the network name and the pin name are identical. For example, a pin name and a network name of a clock pin of a subscriber identification module (SIM) card generally include "SIM_CLK", and a pin name and a network name of an input and output pin generally include "SIM_IO", etc.

In the present disclosure, naming manners of the pin name and the network name are not limited. In an example, a pin can be named as "interface-function_signal-category". In this way, an interface category and a signal category that a pin belongs to can be determined according to the pin name. For example, for a pin name "SIM_CLK", an interface that the pin belongs to can be determined as a SIM card interface, and the pin is configured to transmit a clock signal. Of course, it should be understood that the above description of the naming manners of the pin name is exemplary and should not be regarded as a limitation on the present disclosure. Those skilled in the art can set a category of the pin name and a category of the network name as needed, which is not limited by the present disclosure.

In a possible implementation, the standard part information can further include part numbers, and determining whether the parts in the schematic circuit diagram are in the preset part list according to the netlist file and the BOM list at step S12 further includes: obtaining a part number according to the part type of the part, in a case that the standard part type identical with the part type of the part does not exist in the preset part list; determining a pin name and a network name of the part in the netlist file according to the part number; and determining a target part type of the part in the standard part information according to the pin name and the network name of the part.

In an example, part numbers have a one-to-one correspondence with part types in the BOM list, part numbers have corresponding relationships with pin names, network names, and pin counts in the netlist file. Therefore, in the implementations of the present disclosure, the part number of the part can be obtained according to the part type of the part, and the pin name and the network name of the part can be determined in the netlist file after the part number of the part is obtained.

In some cases, due to differences of each manufacturer and each technician, part types of parts in each schematic circuit diagram may be different. For example, an identical part may have different part types without an agreement, and in this case, whether a part is in the preset part list cannot be determined according to a part type different from the standard part type. Therefore, in the implementations of the present disclosure, the target part type of the part can be determined in the standard part information according to the pin name and the network name of the part. The following is an exemplary introduction to possible implementations that the target part type of the part can be determined in the standard part information according to the pin name and the network name of the part.

In a possible implementation, the standard part information includes standard pin names and standard network names of the parts, and determining the target part type of the part in the standard part information according to the pin name and the network name of the part includes: obtaining a keyword in at least one of the pin name or the network name of the part; and determining a standard part type of a part corresponding to a matched standard pin name and/or a matched standard network name in the preset part list as a target part type of the part, in a case that a standard pin name and/or a standard network name matching the keyword in at least one of the pin name or the network name of the part exists in the preset part list.

According to the above method, in the implementations of the present disclosure, when an original part type of the part (a part type obtained from the BOM list) cannot be matched, the keyword in at least one of the pin name or the network name of the part can be used to match to determine whether the part is in the preset part list. When the standard pin name and/or the standard network name matching the keyword in at least one of the pin name or the network name of the part exists in the preset part list, a present part can be determined to be in the preset part list, and in the implementations of the present disclosure, the standard part type of the part corresponding to the matched standard pin name and/or a matched standard network name in the preset part list can be determined as the target part type of the part.

In an example, if the pin name and the network name of the part include a keyword "SIM", when a corresponding part matching "SIM" in the preset part list is a SIM part and its standard part type is "SIM_Card", the part can be determined to be the SIM part and the target part type can be determined to be "SIM_Card".

When the keyword in at least one the pin name or the network name of the part is not matched in the preset part list, the present part can be determined to be not in the preset part list, which can be recorded in the check result as warning information in this case.

Of course, after a corresponding standard part type is queried by fuzzy matching according to the keyword in at least one of the pin name or the network name of the part, next determination can further be performed. For example, a pin count of the part can be obtained from the netlist file and a pin count of a matched part can be obtained from the preset part list. When the pin count of the part is equal to the pin count of the matched part, the present part can be determined to be in the preset part list. According to such a method, in the implementations of the present disclosure, reliability of checking can be improved and a more accurate check result can be obtained.

In a possible implementation, determining the target part type of the part in the standard part information according to the pin name and the network name of the part further includes: determining that the part does not exist in the preset part list, in a case that the standard pin name and/or the standard network name matching the keyword in at least one of the pin name or the network name of the part does not exist in the preset part list.

It should be noted that although the present disclosure gives an exemplary description of determining whether the part exists in the preset part list in the order of part type matching followed by keyword matching, the present disclosure is not limited thereto. In some implementations, the part type matching can be performed first. When whether the part is in the preset part list cannot be determined by the part type, keyword matching can be determined next. When whether the part exists in the preset part list cannot be determined according to the keyword in at least one of the pin name or network name of the part, a check result can be recorded. Of course, the keyword matching can be determined before the part type matching.

Figure 3:
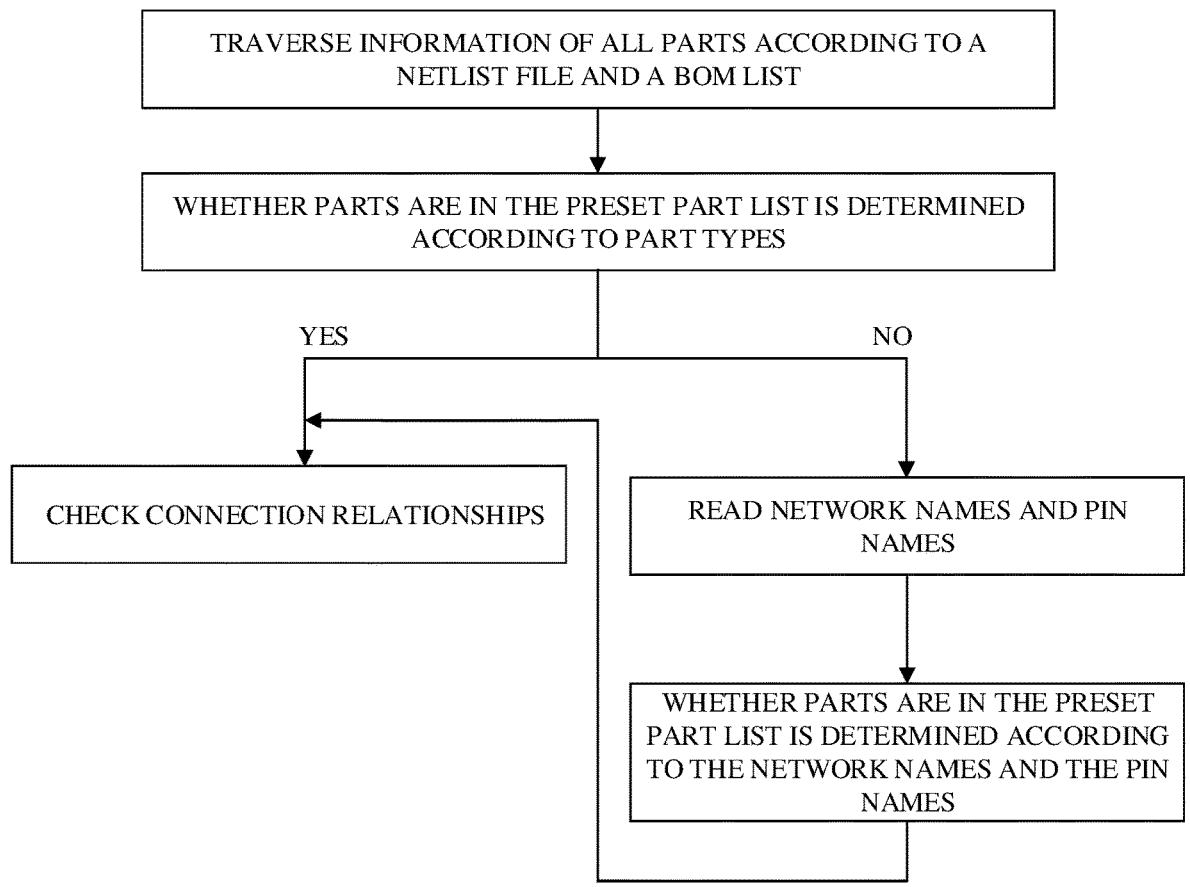
FIG. 3 is a schematic diagram of a method for checking a schematic circuit diagram according to an implementation of the present disclosure.

Reference can be made to FIG. 3, which is a schematic diagram of a method for checking a schematic circuit diagram according to an implementation of the present disclosure.

As illustrated in FIG. 3, in the implementations of the present disclosure, whether all parts of the schematic circuit diagram are in the preset part list can be queried by traversal. When the part information is obtained according to the netlist file and the BOM list, whether parts are in the preset part list can be determined according to part types. When whether the parts are in the preset part list cannot be determined according to the part types (No), network names and pin names can be determined according to part numbers, and whether the parts are in the preset part list can be determined according to the network names and the pin names (i.e., the part types are identified by reading network names and pin names). When determination of all parts is completed, connection relationships of parts determined to exist in the preset part list are determined (Yes).

Possible implementations of determining whether the parts are in the preset part list have been described above and an exemplary introduction of whether connection relationships of each part satisfy the preset connection relationships is given below.

In a possible implementation, the parts in the schematic circuit diagram include a main chip and other parts coupled with the main chip, and determining whether the connection relationships among the parts meet the preset connection relationships at step S12 includes: determining the main chip according to the preset part list and part types of the parts in the BOM list; determining whether an actual connection object of an interface to be checked of the main chip is identical with a preset connection object of the interface to be checked of the main chip in the preset connection relationships; and determining whether an actual connection relationship between each pin of the interface to be checked of the main chip and each pin of the actual connection object is identical with a preset connection relationship between each pin of the interface to be checked of the main chip and each pin of the preset connection object, in a case that the actual connection object is identical with the preset connection object.

According to the above method, in the implementations of the present disclosure, the connection relationships of each pin of a specified interface to be checked can be determined, to determine whether the connection relationships among each pin of the main chip and the pins of other parts meet the preset connection relationships.

In a schematic circuit diagram, there are numerous parts, which can be divided into different categories. For example, a part that provides core functions (abundant and complex functions) can be a main chip (such as a SIM part, a Bluetooth chip, etc.), and a part with a single function is an ordinary part (i.e., other parts). In the implementations of the present disclosure, the main chip can be determined according to the part types of the parts (e.g., the main chip in the schematic circuit diagram can be determined by matching the part types in the BOM list with a main chip in the preset part list).

For different products, objects to be checked in schematic circuit diagrams can be different. For example, assuming that a main chip includes a translator interface, a camera interface, and a display interface, if a product has a single function which only needs to implement a translator without a display and a camera, the display interface and the camera interface do not need to be checked, and only the translator interface needs to be checked.

In the implementations of the present disclosure, an interface to be checked is specified and connection relationships of the interface to be check are checked, such that interfaces that do not need to be checked can be avoided checking and check efficiency can be improved. If the interface to be checked is not specified, in this example, the display interface and the camera interface will be checked according to a default check flow, which obviously wastes resources and costs. Therefore, in the implementations of the present disclosure, costs and resources can be reduced, while check efficiency can be improved.

In the implementations of the present disclosure, targeted check can be performed by specifying the interface to be checked, so as to meet different needs and increase flexibility and environmental adaptability.

In a possible implementation, determining whether the actual connection object of the interface to be checked of the main chip is identical with the preset connection object of the interface to be checked of the main chip in the preset connection relationships includes: determining a pin name and a network name of the interface to be checked in the netlist file and the BOM list, where the network name is used to indicate connection relationships among a pin of a part and pins of other parts; and determining the actual connection object according to the pin name and the network name of the interface to be checked, to determine whether the actual connection object is identical with the preset connection object in the preset connection relationships.

According to the above method, in the implementations of the present disclosure, the actual connection object of the interface to be checked can be conveniently and quickly determined according to the pin name and the network name of the interface to be checked, such that check efficiency can be improved.

In the present disclosure, implementations of how to determine the actual connection object according to the pin name and the network name of the interface to be checked are not limited, and those skilled in the art may can select a corresponding method as needed.

In an example, a connection relationship of the interface to be checked can be determined according to the pin name and the network name, and the actual connection object of the interface to be check can be determined according to the connection relationship.

The pin name and the network name can include an interface function category and a signal category of each pin of the interface to be checked. Therefore, the connection relationship of the interface to be checked can be determined according to the pin name and the network name, so as to determine the actual connection object according to the connection relationship. For example, if a pin name of a pin of the interface to be checked includes "SIM_CLK", the pin can be determined to belong to an interface of a SIM part, and the actual connection object of the interface to be checked can be determined to be the SIM part.

Of course, the above description is exemplary and should not be regarded as a limitation on the present disclosure.

In a possible implementation, the preset connection object can be determined not only according to the preset connection relationship in the database, but also according to the pin name and the network name of the part in the preset part list or the netlist file of the schematic circuit diagram.

In an example, an interface category of the interface to be checked, i.e., the connection object of the interface to be checked, will be generally written into the pin name and the network name. For example, when the interface to be checked is defined to be coupled with the SIM part, the pin name and the network name of the interface to be checked will include a keyword "SIM". Therefore, the preset connection object of the interface to be checked can be determined according to the pin name and the network name of the interface to be checked.

In a possible implementation, the method further includes: in prior to determining whether the actual connection relationship between each pin of the interface to be checked of the main chip and each pin of the actual connection object is identical with the preset connection relationship between each pin of the interface to be checked of the main chip and each pin of the preset connection object, determining whether an input/output relationship between each pin of the interface to be checked and each pin of the actual connection object of the interface to be checked is identical with a preset input/output relationship in the preset connection relationships.

For example, the pin of the interface to be checked may be of an output category or an input category, such as a clock pin CLK. When the main chip outputs a clock signal, a CLK pin of the interface to be checked is of an output category, correspondingly, a CLK pin of the actual connection object should be of an input category. Assuming that the CLK pin of the interface to be checked is coupled with a pin of an output category (the CLK pin of the interface to be checked needs to receive a signal), or the CLK pin of the actual connection object is coupled with a pin of an input category (the CLK pin of the actual connection object needs to output a signal), an error is indicated to occur.

When a check result of one pin of the interface to be checked is obtained (including correct and wrong ones), a check process of the next pin of the interface to be checked can be performed. When all pins of the interface to be checked are checked, a check process of the next interface can be performed. When all interfaces are checked, a check result can be output.

The following is an exemplary introduction to checking the connection relationship of the interface to be checked.

Figure 4:
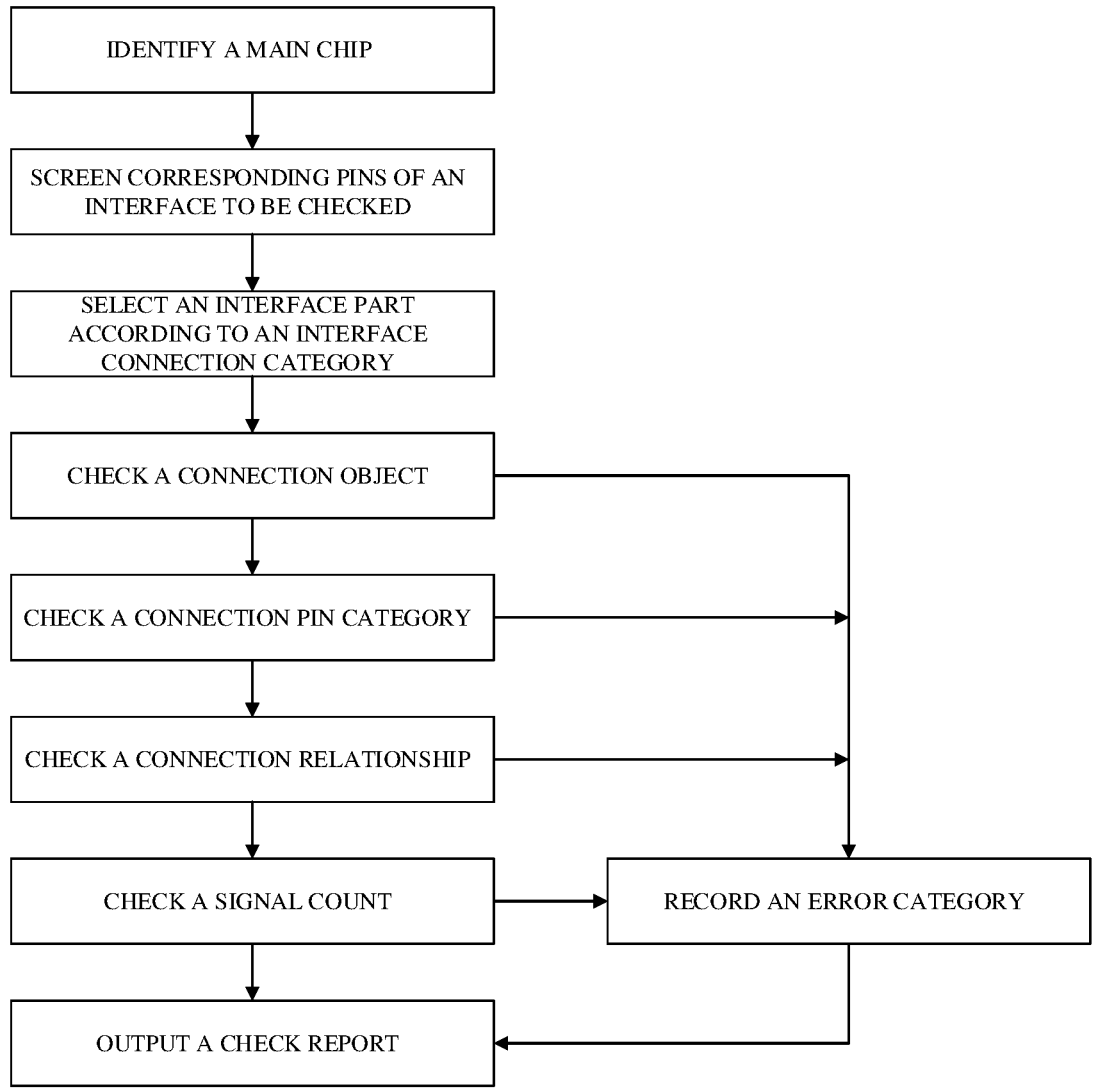
FIG. 4 is a schematic diagram of a method for checking a schematic circuit diagram according to an implementation of the present disclosure.

Reference can be made to FIG. 4, which is a schematic diagram of a method for checking a schematic circuit diagram according to an implementation of the present disclosure.

In an example, as illustrated in FIG. 4, in the implementations of the present disclosure, when all parts of the schematic circuit diagram are traversed and queried and whether each part is in the preset part list is determined, whether connection relationships of parts meet the preset connection relationships can be checked.

As illustrated in FIG. 4, in the implementations of the present disclosure, the connection relationships can be checked based on the main chip. When the main chip is identified, the pins of the interface to be checked (including pin names and network names) can be screened and determined, and the actual connection object (an actually coupled part) can be determined according to a pin name and a network name to check the connection object. If the actual connection object is identical with the preset connection object, the connection relationships of the pins of the interface to be checked are determined (e.g., pin categories (input/output relationships), specific connection relationships among the pins, etc., can be included). If there is an error in a check process, an error category is recorded, and a check result is output (i.e., a check report) after all pins are checked.

Of course, the above introduction is exemplary, and for the implementations of each step in FIG. 4, please refer to the previous introduction, which will not be repeated here.

According to the above method, in the implementations of the present disclosure, the schematic circuit diagram can be quickly and accurately checked to obtain the check result, such that check efficiency of the schematic circuit diagram can be improved, and time and labor costs can be saved.

Figure 5:
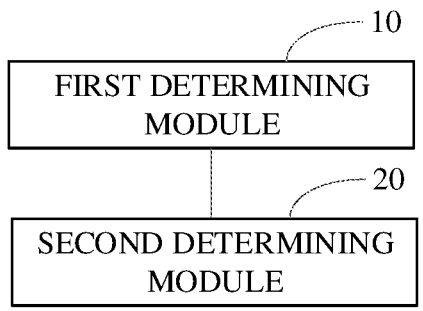
FIG. 5 is a schematic diagram of an apparatus for checking a schematic circuit diagram according to an implementation of the present disclosure.

Reference can be made to FIG. 5, which is a schematic diagram of an apparatus for checking a schematic circuit diagram according to an implementation of the present disclosure.

As illustrated in FIG. 5, the apparatus includes a first determining module 10 and a second determining module 20. The first determining module 10 is configured to determine a netlist file and a BOM list of the schematic circuit diagram, where the schematic circuit diagram is drawn by an EDA tool. The second determining module 20 is coupled with the first determining module 10 and configured to determine whether parts in the schematic circuit diagram are in a preset part list and determine whether connection relationships among the parts meet preset connection relationships, according to the netlist file and the BOM list, to obtain a check result, where the preset part list includes standard part information of multiple parts.

With the above apparatus, in the implementations of the present disclosure, a corresponding netlist file and a corresponding BOM list are determined according to the schematic circuit diagram, whether the parts in the schematic circuit diagram are in the preset part list is determined and whether the connection relationships among the parts meet the preset connection relationships is determined, according to the netlist file and the BOM list, to check the schematic circuit diagram and obtain the check result. The apparatus for checking the schematic circuit diagram proposed in the implementations of the present disclosure has characteristics of simplicity and accuracy, which can check the schematic circuit diagram quickly and accurately, so as to avoid missing hidden errors and reduce costs in checking, thereby improving check efficiency of the schematic circuit diagram.

In a possible implementation, the standard part information includes standard part types of parts, and the second determining module configured to determine whether the parts in the schematic circuit diagram are in the preset part list according to the netlist file and the BOM list is configured to: determine a part type of each part in the schematic circuit diagram according to the BOM list; and determine that a part exists in the preset part list, in a case that a standard part type identical with a part type of the part exists in the preset part list.

In a possible implementation, the standard part information further includes part numbers, and the second determining module configured to determine whether the parts in the schematic circuit diagram are in the preset part list according to the netlist file and the BOM list is further configured to: obtain a part number according to the part type of the part, in a case that the standard part type identical with the part type of the part does not exist in the preset part list; determine a pin name and a network name of the part in the netlist file according to the part number, where the network name is used to indicate connection relationships among a pin of the part and pins of other parts; and determine a target part type of the part in the standard part information according to the pin name and the network name of the part.

In a possible implementation, the standard part information includes standard pin names and standard network names of the parts, and the second determining module configured to determine the target part type of the part in the standard part information according to the pin name and the network name of the part is configured to: obtain a keyword in at least one of the pin name or the network name of the part; and determine a standard part type of a part corresponding to a matched standard pin name and/or a matched standard network name in the preset part list as a target part type of the part, in a case that a standard pin name and/or a standard network name matching the keyword in at least one of the pin name or the network name of the part exists in the preset part list.

In a possible implementation, the second determining module configured to determine the target part type in the standard part information according to the pin name and the network name of the part is further configured to: determine that the part does not exist in the preset part list, in a case that the standard pin name and/or the standard network name matching the keyword in at least one of the pin name or the network name of the part does not exist in the preset part list.

In a possible implementation, the parts in the schematic circuit diagram includes a main chip and other parts coupled with the main chip, and the second determining module configured to determine whether the connection relationships among the parts meet the preset connection relationships is configured to: determine the main chip according to the preset part list and part types of the parts in the BOM list; determine whether an actual connection object of an interface to be checked of the main chip is identical with a preset connection object of the interface to be checked of the main chip in the preset connection relationships; and determine whether an actual connection relationship between each pin of the interface to be checked of the main chip and each pin of the actual connection object is identical with a preset connection relationship between each pin of the interface to be checked of the main chip and each pin of the preset connection object, in a case that the actual connection object is identical with the preset connection object.

In a possible implementation, the second determining module configured to determine whether the actual connection object of the interface to be checked of the main chip is identical with the preset connection object of the interface to be checked of the main chip in the preset connection relationships is configured to: determine a pin name and a network name of the interface to be checked in the netlist file and the BOM list, where the network name is used to indicate connection relationships among a pin of a part and pins of other parts; and determine the actual connection object according to the pin name and the network name of the interface to be checked, to determine whether the actual connection object is identical with the preset connection object in the preset connection relationships.

In a possible implementation, the second determining module is further configured to determine whether an input/output relationship between each pin of the interface to be checked and each pin of the actual connection object of the interface to be checked is identical with a preset input/output relationship in the preset connection relationships, in prior to the second determining module determines whether the actual connection relationship between each pin of the interface to be checked of the main chip and each pin of the actual connection object is identical with the preset connection relationship between each pin of the interface to be checked of the main chip and each pin of the preset connection object.

It should be noted that the apparatus for checking the schematic circuit diagram is an apparatus corresponding to the method for checking the schematic circuit diagram, and for specific description of the apparatus, please refer to the previous introduction to the method, which will not be repeated here.

Figure 6:
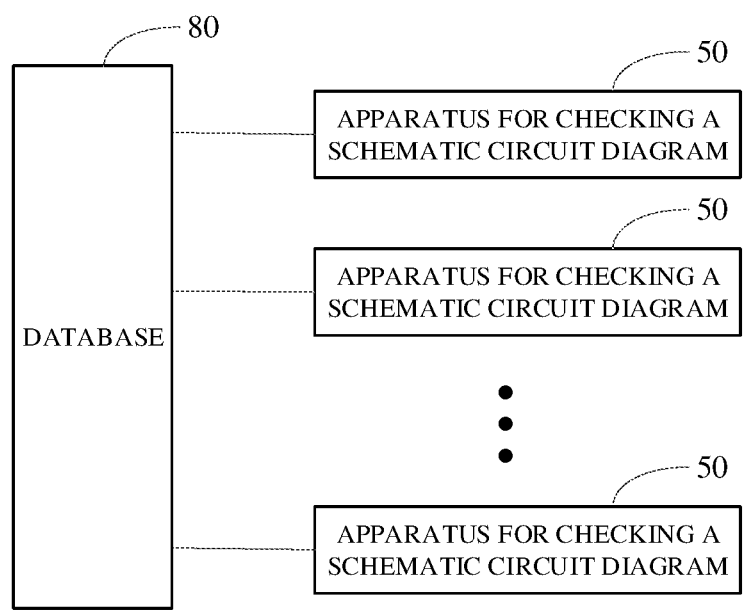
FIG. 6 illustrates a system for checking a schematic circuit diagram according to an implementation of the present disclosure.

Reference can be made to FIG. 6, which illustrates a system for checking a schematic circuit diagram according to an implementation of the present disclosure.

As illustrated in FIG. 6, the system includes multiple apparatuses 50 for checking schematic circuit diagrams and a database 80. The database 80 is configured to provide a preset part list and preset connection relationships.

With the above system, in the implementations of the present disclosure, the multiple apparatuses 50 for checking the schematic circuit diagrams can realize independent and parallel operation, so as to check each schematic circuit diagram of the system, thereby improving operation efficiency.

It should be noted that in the implementations of the present disclosure, specific categories of the database 80 are not limited, and those skilled in the art can select appropriate databases to implement as needed.

Figure 7:
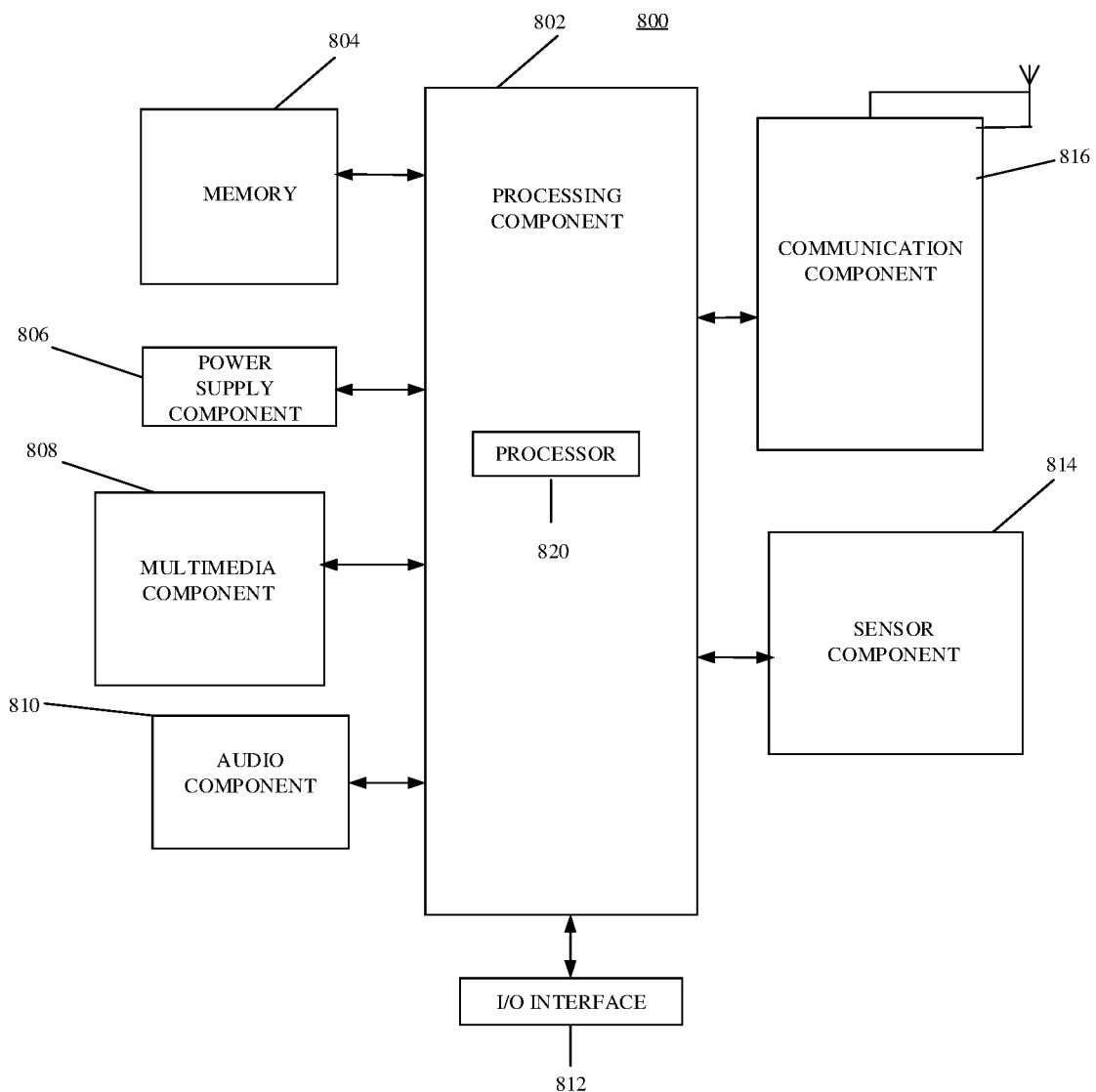
FIG. 7 is a block diagram of an apparatus for checking a schematic circuit diagram according to an implementation of the present disclosure.

Reference can be made to FIG. 7, which is a is a block diagram of an apparatus 800 for checking a schematic circuit diagram according to an implementation of the present disclosure. For example, the apparatus 800 may be a mobile phone, a computer, a digital broadcast terminal, a messaging device, a gaming console, a tablet device, a medical device, an exercise equipment, a personal digital assistant, etc.

Reference can be made to FIG. 7, the apparatus 800 may include one or more of the following components: a processing component 802, a memory 804, a power supply component 806, a multimedia component 808, an audio component 810, an input/output (I/O) interface 812, a sensor component 814, and a communication component 816.

The processing component 802 typically controls the overall operation of the apparatus 800, such as operations associated with display, telephone call, data communication, camera operation, and recording operation. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various categories of data to support operations in the apparatus 800. Examples of these data include instructions for any application or method operated on the apparatus 800, contact data, phonebook data, messages, pictures, videos, and the like. The memory 804 may be implemented by any category of transitory or non-transitory storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk, or optical disk.

The power supply assembly 806 provides power to various components of the apparatus 800. The power component 806 may include a power management system, one or more power supplies, and other components associated with generating, managing, and allocating power for the apparatus 800.

The multimedia component 808 includes a screen providing an output interface between the apparatus 800 and a user. In some implementations, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The touch sensor can not only sense the boundary of the touch or slide operation, but also detect the duration and pressure related to the touch or slide operation. In some implementations, the multimedia component 808 includes a front camera and/or a rear camera. When the apparatus 800 is in an operation mode, such as shooting mode or video mode, the front camera and/or rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive an external audio signal when the apparatus 800 is in an operation mode, such as a call mode, a recording mode, and a speech recognition mode. The received audio signal may be further stored in the memory 804 or transmitted via the communication component 816. In some implementations, the audio component 810 also includes a speaker for outputting an audio signal.

The I/O interface 812 provides an interface between the processing component 802 and a peripheral interface module. The peripheral interface module can be a keyboard, click wheel, button, etc. These buttons may include but are not limited to: home button, volume button, start button, and lock button.

The sensor assembly 814 includes one or more sensors for providing state evaluation on various aspects for the apparatus 800. For example, the sensor assembly 814 may detect an on/off state of the apparatus 800 and the relative positioning of the components. For example, the components are the display and keypad of the apparatus 800. The sensor component 814 can also detect position change of the apparatus 800 or one component of the apparatus 800, presence or absence of user contact with the apparatus 800, orientation or acceleration/deceleration of the apparatus 800, and temperature change of the apparatus 800. The sensor assembly 814 may include a proximity sensor configured to detect presence of nearby objects without any physical contact. The sensor assembly 814 may further include an optical sensor, such as a complementary metal oxide semiconductor (CMOS) or charge-coupled device (CCD) image sensor, for use in imaging applications. In some implementations, the sensor assembly 814 may also include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as wireless fidelity (WiFi), the $2^{nd}$ generation (2G) or the $3^{rd}$ generation (3G), or a combination thereof. In an exemplary implementation, the communication component 816 receives a broadcast signal or broadcast related information from an external broadcast management system via a broadcast channel. In an exemplary implementation, the communication component 816 also includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary implementation, the apparatus 800 may be implemented by one or more application specific integrated circuits (ASIC), digital signal processors (DSPS), digital signal processing devices (DSPD), programmable logic devices (PLD), field programmable gate arrays (FPGA), controllers, microcontrollers, microprocessors, or other electronic components for performing the above methods.

In an exemplary implementation, a non-transitory computer readable storage medium is further provided, for example, a memory 804 storing computer program instructions. The computer program instructions are operable with a processor 820 of the apparatus 800 to perform the above methods.

Figure 8:
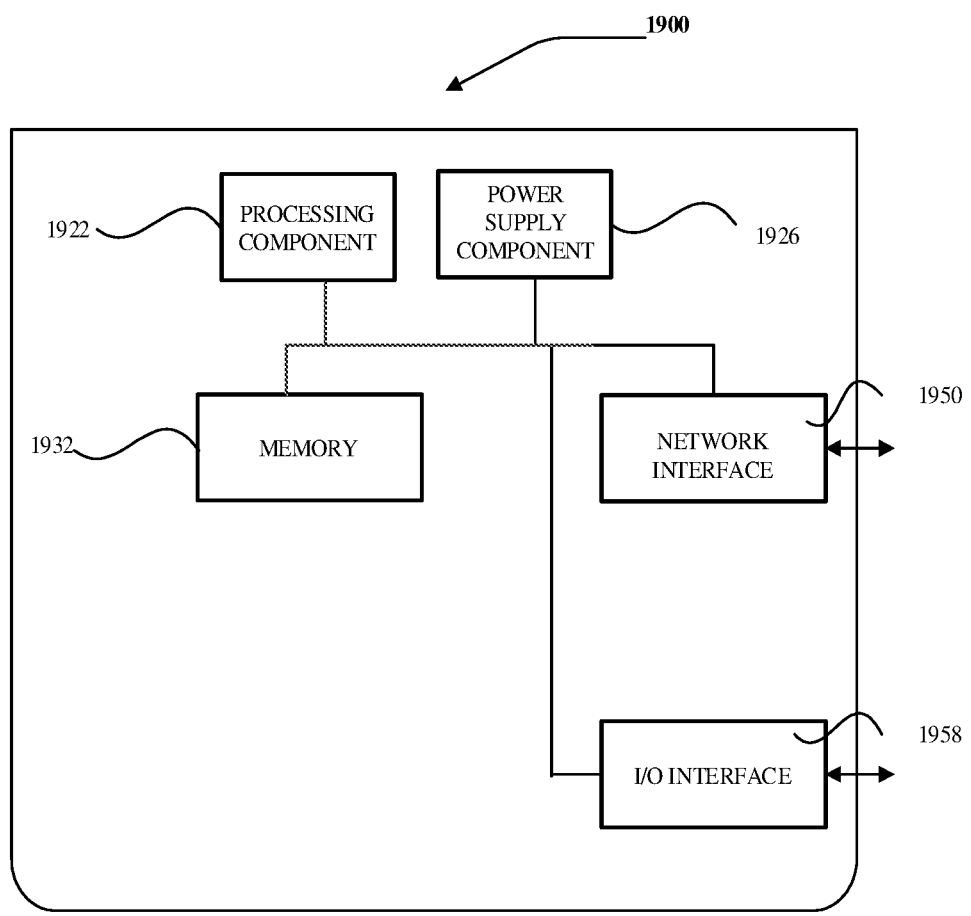
FIG. 8 is a block diagram of an apparatus for checking a schematic circuit diagram according to an implementation of the present disclosure.

Reference can be made to FIG. 8, which is a block diagram of an apparatus 1900 for checking a schematic circuit diagram according to an implementation of the present disclosure. For example, the apparatus 1900 can be provided as a server. Referring to FIG. 9, the apparatus 1900 includes a processing component 1922, which further includes one or more processors as well as memory resources represented by a memory 1932 and configured to store instructions (such as applications) executable with the processing component 1922. The application stored in the memory 1932 may include one or more modules, each corresponding to a set of instructions. In addition, the applications stored in the processing component 1922 is configured to carry out instructions to perform the above methods.

The apparatus 1900 may further include a power supply component 1926 configured to perform power management of the apparatus 1900, a wired or wireless network interface 1950 configured to connect the apparatus 1900 to the network, and an I/O interface 1958. The apparatus 1900 may operate an operating system stored in the memory 1932, such as Windows Server™, Mac OS X™, Unix™, Linux™, FreeBSD™, etc.

In an exemplary implementation, a non-transitory computer readable storage medium is provided, such as the memory 1932 storing computer program instructions. The computer program instructions can be carried out by the processing component 1922 of the apparatus 1900 to perform the above methods.

This disclosure can be a system, a method, and/or a computer program product. The computer program product includes a computer readable storage medium, which carries computer readable program instructions for a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of a computer-readable storage medium include: portable computer disk, hard disk, random access memory (RAM), read only memory (ROM), erasable programmable ROM (EPROM or flash memory), static RAM (SRAM), portable compact disk ROM (CD-ROM), digital multifunction disk (DVD), a memory stick, a floppy disk, a mechanical encoding device, such as a punch card or a convex structure in a groove on which instructions are stored, and any suitable combination of the above. The computer-readable storage medium used herein is not interpreted as an instantaneous signal itself, such as a radio wave or other freely propagating electromagnetic wave, an electromagnetic wave propagating through a waveguide or other transmission medium (for example, an optical pulse through an optical fiber cable), or an electrical signal transmitted through a wire.

The computer-readable program instructions described herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. The network adapter card or network interface in each computing/processing device receives computer-readable program instructions from the network and forwards the computer-readable program instructions to be stored in the computer-readable storage medium in each computing/processing device.

The computer program instructions for performing the operations of the disclosure may be assembly instructions, instruction set architecture (ISA) instructions, machine instructions, machine related instructions, microcode, firmware instructions, status setting data, or source code or object code written in any combination of one or more programming languages. The programming languages include object-oriented programming languages such as Smalltalk, C++, etc., and conventional procedural programming languages such as "C" language or similar programming languages. Computer readable program instructions may be executed completely on a user's computer, partially on the user's computer, as a separate software package, partially on the user's computer and partially on a remote computer, or completely on the remote computer or server. In the case of the remote computer, the remote computer may be connected to the user computer through any kind of network, including a LAN or a WAN, or may be connected to an external computer (for example, connected through an Internet via an Internet service provider). In some implementations, an electronic circuit such as a programmable logic circuit, a field programmable gate array (FPGA), or a programmable logic array (PLA) can be personalized by utilizing the state information of computer-readable program instructions. The electronic circuit can carry out computer readable program instructions, so as to implement various aspects of the disclosure.

Various aspects of the disclosure are described herein with reference to flowcharts and/or block diagrams of methods, devices (systems) and computer program products according to implementations of the disclosure. It should be understood that each block of a flowchart and/or block diagram and a combination of blocks in the flowchart and/or block diagram may be implemented by computer-readable program instructions.

These computer-readable program instructions can be provided to a processor of a general-purpose computer, a special-purpose computer, or other programmable data processing devices, so as to produce a machine so that when these instructions are executed by a processor of a computer or other programmable data processing devices, a device is generated to realize the functions/actions specified in one or more blocks in the flowchart and/or block diagram. These computer-readable program instructions may also be stored in a computer-readable storage medium, to cause computers, programmable data processing devices, and/or other devices to operate in a specific manner, so that the computer-readable medium in which the instructions are stored includes a manufacture which includes instructions to implement various aspects of the functions/actions specified in one or more blocks in the flowchart and/or block diagram.

Computer readable program instructions may also be loaded onto a computer, other programmable data processing devices, or other devices, so that a series of operation steps are performed on the computer, other programmable data processing device, or other devices to generate a computer implemented process, so that instructions executed in the computer, other programmable data processing device, or other devices can realize the functions/actions specified in one or more blocks in the flowchart and/or block diagram.

The flowchart and block diagram in the accompanying drawings show the architecture, functions and operations of possible implementations of systems, methods and computer program products according to various implementations of the disclosure. In this regard, each block in the flowchart or block diagram may represent a part of a module, program segment, or instruction containing one or more executable instructions for realizing a specified logical function. In some alternative implementations, the functions marked in the blocks may also occur in a different order than those marked in the drawings. For example, two consecutive blocks can actually be executed basically in parallel, and they sometimes can be executed in the opposite order, depending on the function involved. It should also be noted that each block in the block diagram and/or flowchart and the combination of blocks in the block diagram and/or flowchart can be realized by a dedicated hardware based system performing specified functions or actions, or by a combination of dedicated hardware and computer instructions.

Various implementations of the present disclosure have been described above, and the above description is exemplary rather than exhaustive, and is not limited to the various implementations disclosed. Without departing from the scope and spirit of the various implementations described, many modifications and changes are obvious to those skilled in the art. The terms used herein are selected to best explain the principle, practical application, or improvement of the technology in the market of each implementation, or to enable other ordinary skilled person in the art to understand the various implementations disclosed herein.

What is claimed is:

1. A method for checking a plurality of schematic circuit diagrams in parallel, performed by an electronic device installed with an electronic design automation (EDA) tool and comprising:
   determining a netlist file and a bill of material (BOM) list of each schematic circuit diagram in the plurality of schematic circuit diagrams with the EDA tool in parallel, wherein the plurality of schematic circuit diagrams are drawn by the EDA tool; and
   determining whether parts in said each schematic circuit diagram are in a preset part list in parallel and determining whether connection relationships among the parts meet preset connection relationships in parallel, according to the netlist file and the BOM list of said each schematic circuit diagram, to obtain check results, wherein the preset part list comprises standard part information of a plurality of parts.

2. The method of claim 1, wherein the preset part list and the preset connection relationships are stored as a standard file in a database in advance; and wherein, the method further comprises:
   before determining whether the parts in said each schematic circuit diagram are in the preset part list and determining whether the connection relationships among the parts meet the preset connection relationships:
   obtaining the preset part list and the preset connection relationships from the database.

3. The method of claim 1, wherein the standard part information comprises standard part types of parts, and determining whether the parts in said each schematic circuit diagram are in the preset part list according to the netlist file and the BOM list comprises:
   determining a part type of each part in said each schematic circuit diagram according to the BOM list; and
   determining that a part exists in the preset part list, in a case that a standard part type identical with a part type of the part exists in the preset part list.

4. The method of claim 1, wherein the netlist file of said each schematic circuit diagram comprises a part number, a pin number, a pin name, a pin count, a network name of each part in said each schematic circuit diagram; the BOM list of said each schematic circuit diagram comprises a part number and a part type of each part in said each schematic circuit diagram; and part numbers of identical parts are identical in the netlist file and the BOM list.

5. The method of claim 4, wherein determining whether the parts in said each schematic circuit diagram are in the preset part list according to the netlist file and the BOM list further comprises:
   obtaining a part number in the BOM list according to the part type of the part, in a case that the standard part type identical with the part type of the part does not exist in the preset part list;
   determining a pin name and a network name of the part in the netlist file according to the part number, wherein the network name is used to indicate connection relationships among a pin of the part and pins of other parts; and determining a target part type of the part in the standard part information according to the pin name and the network name of the part.

6. The method of claim 5, wherein the standard part information comprises standard pin names and standard network names of the parts, and determining the target part type of the part in the standard part information according to the pin name and the network name of the part comprises:
obtaining a keyword in at least one of the pin name or the network name of the part; and
determining a standard part type of a part corresponding to a matched standard pin name and/or a matched standard network name in the preset part list as a target part type of the part, in a case that a standard pin name and/or a standard network name matching the keyword in at least one of the pin name or the network name of the part exists in the preset part list.

7. The method of claim 6, wherein further comprising:
determining that the part does not exist in the preset part list, in a case that the standard pin name and/or the standard network name matching the keyword in at least one of the pin name or the network name of the part does not exist in the preset part list.

8. The method of claim 1, wherein the parts in said each schematic circuit diagram comprise a main chip and other parts coupled with the main chip, and determining whether the connection relationships among the parts meet the preset connection relationships comprises:
determining the main chip according to the preset part list and part types of the parts in the BOM list;
determining whether an actual connection object of an interface to be checked of the main chip is identical with a preset connection object of the interface to be checked of the main chip in the preset connection relationships; and
determining whether an actual connection relationship between each pin of the interface to be checked of the main chip and each pin of the actual connection object is identical with a preset connection relationship between each pin of the interface to be checked of the main chip and each pin of the preset connection object, in a case that the actual connection object is identical with the preset connection object.

9. The method of claim 8, wherein determining whether the actual connection object of the interface to be checked of the main chip is identical with the preset connection object of the interface to be checked of the main chip in the preset connection relationships comprises:
determining a pin name and a network name of the interface to be checked in the netlist file and the BOM list, wherein the network name is used to indicate connection relationships among a pin of a part and pins of other parts; and
determining the actual connection object according to the pin name and the network name of the interface to be checked, and determining whether the actual connection object is identical with the preset connection object in the preset connection relationships.

10. The method of claim 8, further comprising:
in prior to determining whether the actual connection relationship between each pin of the interface to be checked of the main chip and each pin of the actual connection object is identical with the preset connection relationship between each pin of the interface to be checked of the main chip and each pin of the preset connection object, determining whether an input/output relationship between each pin of the interface to be checked and each pin of the actual connection object of the interface to be checked is identical with a preset input/output relationship in the preset connection relationships.

11. An apparatus for checking a plurality of schematic circuit diagrams in parallel, comprising:
a processor; and
a memory configured to store processor-executable instructions, wherein the processor is configured to implement:
determining a netlist file and a bill of material (BOM) list of each schematic circuit diagram in the plurality of schematic circuit diagrams in parallel, wherein the plurality of schematic circuit diagrams are drawn by an electronic design automation (EDA) tool; and
determining whether parts in said each schematic circuit diagram are in a preset part list in parallel and determining whether connection relationships among the parts meet preset connection relationships in parallel, according to the netlist file and the BOM list of said each schematic circuit diagram, to obtain check results, wherein the preset part list comprises standard part information of a plurality of parts.

12. The apparatus of claim 11, wherein the preset part list and the preset connection relationships are stored as a standard file in a database in advance; and wherein, the processor is further configured to implement:
before determining whether the parts in said each schematic circuit diagram are in the preset part list and determining whether the connection relationships among the parts meet the preset connection relationships:
obtaining the preset part list and the preset connection relationships from the database.

13. The apparatus of claim 11, wherein the standard part information comprises standard part types of parts, and in terms of determining whether the parts in said each schematic circuit diagram are in the preset part list according to the netlist file and the BOM list, the processor is further configured to implement:
determining a part type of each part in said each schematic circuit diagram according to the BOM list; and
determining that a part exists in the preset part list, in a case that a standard part type identical with a part type of the part exists in the preset part list.

14. The apparatus of claim 11, wherein the netlist file of said each schematic circuit diagram comprises a part number, a pin number, a pin name, a pin count, a network name of each part in said each schematic circuit diagram; the BOM list of said each schematic circuit diagram comprises a part number and a part type of each part in said each schematic circuit diagram; and part numbers of identical parts are identical in the netlist file and the BOM list.

15. The apparatus of claim 14, wherein in terms of determining whether the parts in said each schematic circuit diagram are in the preset part list according to the netlist file and the BOM list, the processor is further configured to implement:
obtaining a part number in the BOM list according to the part type of the part, in a case that the standard part type identical with the part type of the part does not exist in the preset part list;
determining a pin name and a network name of the part in the netlist file according to the part number, wherein the network name is used to indicate connection relationships among a pin of the part and pins of other parts; and determining a target part type of the part in the standard part information according to the pin name and the network name of the part.

16. The apparatus of claim 15, wherein the standard part information comprises standard pin names and standard network names of the parts, and in terms of determining the target part type of the part in the standard part information according to the pin name and the network name of the part, the processor is further configured to implement:

obtaining a keyword in at least one of the pin name or the network name of the part; and determining a standard part type of a part corresponding to a matched standard pin name and/or a matched standard network name in the preset part list as a target part type of the part, in a case that a standard pin name and/or a standard network name matching the keyword in at least one of the pin name or the network name of the part exists in the preset part list.

17. The apparatus of claim 11, wherein the parts in said each schematic circuit diagram comprise a main chip and other parts coupled with the main chip, and in terms of determining whether the connection relationships among the parts meet the preset connection relationships, the processor is further configured to implement:

determining the main chip according to the preset part list and part types of the parts in the BOM list;

determining whether an actual connection object of an interface to be checked of the main chip is identical with a preset connection object of the interface to be checked of the main chip in the preset connection relationships; and determining whether an actual connection relationship between each pin of the interface to be checked of the main chip and each pin of the actual connection object is identical with a preset connection relationship between each pin of the interface to be checked of the main chip and each pin of the preset connection object, in a case that the actual connection object is identical with the preset connection object.

18. The apparatus of claim 17, wherein in terms of determining whether the actual connection object of the interface to be checked of the main chip is identical with the preset connection object of the interface to be checked of the main chip in the preset connection relationships, the processor is further configured to implement:

determining a pin name and a network name of the interface to be checked in the netlist file and the BOM list, wherein the network name is used to indicate connection relationships among a pin of a part and pins of other parts; and determining the actual connection object according to the pin name and the network name of the interface to be checked, and determining whether the actual connection object is identical with the preset connection object in the preset connection relationships.

19. The apparatus of claim 17, wherein the processor is further configured to implement:

in prior to determining whether the actual connection relationship between each pin of the interface to be checked of the main chip and each pin of the actual connection object is identical with the preset connection relationship between each pin of the interface to be checked of the main chip and each pin of the preset connection object, determining whether an input/output relationship between each pin of the interface to be checked and each pin of the actual connection object of the interface to be checked is identical with a preset input/output relationship in the preset connection relationships.

20. A non-transitory computer-readable storage medium configured to store computer program instructions which, when executed by a processor, are operable with the processor to implement:

determining a netlist file and a bill of material (BOM) list of each schematic circuit diagram in a plurality of schematic circuit diagrams, wherein the plurality of schematic circuit diagrams are drawn by an electronic design automation (EDA) tool; and determining whether parts in said each schematic circuit diagram are in a preset part list in parallel and determining whether connection relationships among the parts meet preset connection relationships in parallel, according to the netlist file and the BOM list, to obtain a check results, wherein the preset part list comprises standard part information of a plurality of parts.

* * * * *